United States Patent
Gama et al.

(10) Patent No.: US 7,168,677 B2
(45) Date of Patent: Jan. 30, 2007

(54) MOTOR-OPERATED VALVE APPARATUS

(75) Inventors: Atsuhito Gama, Nagoya (JP);
Shinichiro Hata, Nagoya (JP);
Hiroyuki Yamada, Nagoya (JP);
Kazuya Hirota, Nagoya (JP)

(73) Assignee: Rinnai Corpoartion, Nagoya (JP)

( * ) Notice: Subject to any disclaimer, the term of this patent is extended or adjusted under 35 U.S.C. 154(b) by 134 days.

(21) Appl. No.: 11/076,491

(22) Filed: Mar. 9, 2005

(65) Prior Publication Data

US 2005/0199844 A1 Sep. 15, 2005

(30) Foreign Application Priority Data

Mar. 11, 2004 (JP) ............................. 2004-068534

(51) Int. Cl.
*F16K 31/44* (2006.01)

(52) U.S. Cl. ..................... 251/69; 251/129.11; 431/6

(58) Field of Classification Search ............... 251/68, 251/69, 70, 71, 129.05, 129.11; 431/6
See application file for complete search history.

(56) References Cited

U.S. PATENT DOCUMENTS

| | | | |
|---|---|---|---|
| 4,771,643 A * | 9/1988 | Mott ............................. 74/2 |
| 5,085,574 A * | 2/1992 | Wilson .......................... 431/6 |
| 6,619,613 B1 * | 9/2003 | Akamatsu et al. ..... 251/129.04 |

FOREIGN PATENT DOCUMENTS

| | | |
|---|---|---|
| EP | 1 152 190 A1 | 11/2001 |
| JP | 62-244300 | 10/1987 |
| JP | 06-213348 | 8/1994 |
| JP | 2003-254534 | 9/2003 |
| JP | 2003-329698 | 11/2003 |

* cited by examiner

*Primary Examiner*—Edward K. Look
*Assistant Examiner*—John K. Fristoe, Jr.
(74) *Attorney, Agent, or Firm*—Rankin, Hill, Porter & Clark LLP (57) ABSTRACT

When a fluid flow channel is interrupted while an electronic circuit unit 50 including a microcomputer 51 and the like receives electric source power, a flow control valve is displaced to a predetermined position closer to a first end of both ends of a motion range of the flow control valve in the fluid flow channel by a stepping motor 29. When the supply of electric source power is restarted after the supply of electric source power to the electronic circuit unit 50 is stopped, a predetermined number of pulses capable of displacing the flow control valve from the first end to a home position are supplied to the stepping motor 29 to displace the flow control valve to the home position with a second end of both ends of the motion range of the flow control valve being the home position of the flow control valve. Thus, the flow control valve is shifted to the home position while preventing occurrence of a disorder of the stepping motor, abnormal sounds and vibrations, in a simple configuration, without requiring means for detecting arrival of the flow control valve at the home position.

5 Claims, 8 Drawing Sheets

MOTOR-OPERATED VALVE APPARATUS

BACKGROUND OF THE INVENTION

1. Field of the Invention

The present invention relates to a motor-operated valve apparatus driving a flow control valve such as a thermal power control valve of a gas cooking appliance by a stepping motor.

2. Description of the Related Art

In a motor-operated valve apparatus operating a flow control valve using a stepping motor as an actuator, the amount of displacement of the flow control valve matches the number of pulses supplied to the stepping motor (hereinafter referred to simply as motor in this section). That is, the amount of rotation of the motor per pulse is fixed and accordingly, the amount of displacement (amount of change in opening degree) of the flow control valve per pulse is fixed. In this motor-operated valve apparatus, the number of pulses supplied to the motor defines a relative amount of change in opening degree of the flow control valve, and therefore for controlling the opening degree (displacement position) of the flow control valve to be a desired opening degree, it is necessary to determine the position of the flow control valve when apparatuses including means for controlling the motor-operated valve apparatus (microcomputer, etc.) and a motor drive circuit are powered up or initialized just thereafter.

As a method for determining the position of the flow control valve, a method in which the flow control valve is forcefully displaced to the end position of a motion range of the flow control valve (fully closed position, fully opened position or the like of the flow control valve which is hereinafter referred to as home position) mechanically restrained (by contact or fitting between members) by a stopper, a valve seat and the like (so called a shift to the home position is made) is known.

In this case, a method in which regardless of the opening degree of the flow control valve during power-up, a predetermined number of pulses sufficient to displace the flow control valve to the home position are supplied to the motor to forcefully the flow control valve to the home position has been previously known (see, for example, paragraph [0006] of Japanese Patent Laid-Open No. 6-213348 (patent document 1)).

However, this method has a problem such that if the initial position of the flow control valve is close to the home position, the motor is driven with an excessive number of pulses even after the flow control valve arrives at the home position and is forcefully stopped at the position, and therefore a disorder of the motor, abnormal sounds and vibrations occur for a relatively long time period. Because the disorder of the motor occurs for a long time period, the lifetime of the motor tends to decrease.

Thus, techniques for solving the problem are disclosed in the patent document 1 and Japanese Patent Laid-Open No. 2003-329698 (patent document 2). A similar motor control technique is disclosed in, for example, Japanese Patent No. 2502515 (patent document 3).

In the techniques found in the patent documents 1 to 3, means for detecting arrival of the flow control valve or a rotor of the motor at the home position is provided, and the supply of pulses to the motor is stopped according to the detection by the means.

In the techniques proposed in the patent documents 1 to 3, pulsed drive of the motor can be stopped when the flow control valve or the rotor of the motor arrives at the home position, thus making it possible to prevent occurrence of the disorder of the motor, abnormal sounds and vibrations. Hence, the techniques have a problem such that since detection means for detecting arrival of the flow control valve or the rotor of the motor at the home position is required, costs are disadvantageously increased, and product structures are complicated. In particular, if a thermal power control valve and a motor for driving the valve are provided for each burner as in a gas cooking appliance having a plurality of burners, the above problem is more significant.

The present invention has been made in view of such a background, and its object is to provide a motor-operated valve apparatus which can shift the flow control valve to the home position while preventing occurrence of the disorder of the stepping motor, abnormal sounds and vibrations in a simple configuration without requiring means for detecting arrival of the flow control valve at the home position.

SUMMARY OF THE INVENTION

For solving the problems, a motor-operated valve apparatus of the present invention is a motor-operated valve apparatus comprising a flow control valve provided in a fluid channel for controlling a fluid flow and having its motion range mechanically restrained, a stepping motor for driving the flow control valve, and control means for supplying pulses to the stepping motor via a motor drive circuit and controlling the amount of displacement of the flow control valve by the stepping motor according to the number of pulses supplied, wherein the control means comprises motor standby operation controlling means for supplying pulses to the stepping motor so that the flow control valve is displaced to a predetermined position closer to a first end of both ends of the motion range of the flow control valve when the fluid channel is interrupted while the motor drive circuit and control means receive electric source power, and shift-to-home position controlling means for supplying to the stepping motor a predetermined number of pulses capable of displacing the flow control valve from the first end to a home position to displace the flow control valve to the home position, with the home position of the flow control valve being a second end of both ends of the motion range of the flow control valve, when the supply of electric source power is restarted after the supply of the electric source power to at least the motor drive circuit and control means is stopped.

According to the motor-operated valve apparatus of the present invention, the flow control valve is displaced to the predetermined position closer to the first end of both ends of the motion thereof when the fluid channel is interrupted (when an on-off valve provided in the fluid channel aside from the flow control valve is closed) while the motor drive circuit and control means receive electric source power. Thus, the flow control valve is displaced to the predetermined position closer to the first end when the supply of electric source power is restarted after the supply of the electric source power to the motor drive circuit and control means is stopped. In this state, a predetermined number of pulses capable of displacing the flow control valve from the first end to the second end being the home position are supplied to the motor to displace the flow control valve to the home position. In this case, the initial position of the flow control valve is the position closer to the first end, and therefore the number of pulses supplied to the stepping motor (the predetermined number of pulses) is larger than the number of pulses required for displacing the flow control valve from its initial position to the home position (second end), but the extra number is sufficiently small. That is, the number of pulses supplied to the stepping motor by the shift-to-home position controlling means is slightly larger than a minimum necessary number of pulses for the entire motion range of the flow control valve (range from the first end to the second end) (the minimum necessary number of pulses plus the number of pulses sufficiently smaller than the minimum necessary number of pulses), and the number of pulses is slightly larger than a minimum necessary number of pulses required for displacing the flow control valve from the initial position closer to the first end to the home position (second end). As a result, when a predetermined number of pulses are supplied to the stepping motor by the shift-to-home position controlling means, the flow control valve is mechanically restrained to the home position before the supply of the pulses, but thereafter the supply of pulses is completed in short time. That is, when the flow control valve is shifted to the home position, a disorder of the stepping motor occurs just before completion of the shift, but the time period over which the disorder occurs is sufficiently short.

Thus, according to the present invention, the flow control valve can be shifted to the home position while preventing occurrence of the disorder of the stepping motor, abnormal sounds and vibrations wherever possible in a simple configuration without requiring means for detecting arrival of the flow control valve at the home position.

In the present invention, the voltage of the pulse supplied to the stepping motor by the shift-to-home position controlling means is preferably lower than at least the voltage of the pulse supplied to the stepping motor by the control means during control of the fluid flow in the fluid channel.

Hence, a generating torque of the stepping motor when the flow control vale is shifted to the home position can be reduced to a relatively small torque. Thus, abnormal sounds and vibrations during occurrence of the disorder of the stepping motor can be reduced to a low level.

The present invention is suitable if the flow control valve is a thermal power control valve provided in a channel for supplying gas to a burner of a gas cooking appliance for controlling a flow of the gas to the burner. That is, since the gas cooking appliance is placed in a room, and a user works near the gas cooking appliance, abnormal sounds and vibrations during occurrence of the disorder of the stepping motor tends to annoy the user if they continue for a long time period. Nevertheless, according to the present invention, the disorder of the stepping motor occurs only for a very short time period as described previously, thus making it possible to effectively prevent such inconvenience at a low cost.

In the present invention applied to the gas cooking appliance, in this way, the first end is preferably one end of both ends of the motion range, which is closer to an ignition position predetermined as a displacement position of the thermal power control valve when the burner is ignited.

Hence, the predetermined position closer to the first end is the position close to the position predetermined as the displacement position of the thermal power control valve when the burner is ignited. Thus, when an instruction to ignite the burner is provided while the electric source power to the motor drive circuit and control means after the thermal power control valve is displaced to the predetermined position closer to the first end by the motor standby operation controlling means, the thermal power control valve can be displaced to the displacement for ignition by the stepping motor quickly (in short time). Therefore, the burner can be ignited quickly. The predetermined position closer to the first end may be identical to the ignition position.

The present invention applied to the gas cooking appliance as described above is suitable when the gas cooking appliance comprises a plurality of sets of the burner, thermal power control valve, stepping motor and motor drive circuit. That is, if the gas cooking appliance comprises a plurality of sets of the burner, thermal power control valve, stepping motor and motor drive circuit, it is necessary to display thermal power control valves to the home position by stepping motors corresponding to the respective thermal power control valves when electric source power is supplied to the motor drive circuit and control means, and therefore if the disorder occurs for a relatively long time period with a plurality of stepping motors, the user tends to be annoyed badly. Nevertheless, according to the present invention, the time period over which the disorder occurs with stepping motors is sufficiently short, and therefore annoyance of the user is effectively prevented. Means for detecting arrival of the thermal power control valve at the home position is not required for any stepping motors, and therefore the cost advantage is significant.

DETAILED DESCRIPTION OF THE PREFERRED EMBODIMENTS

One embodiment of the present invention will be described with reference to FIGS. 1 to 8. This embodiment is an example where the present invention is applied to a gas cooking appliance.

Figure 1:
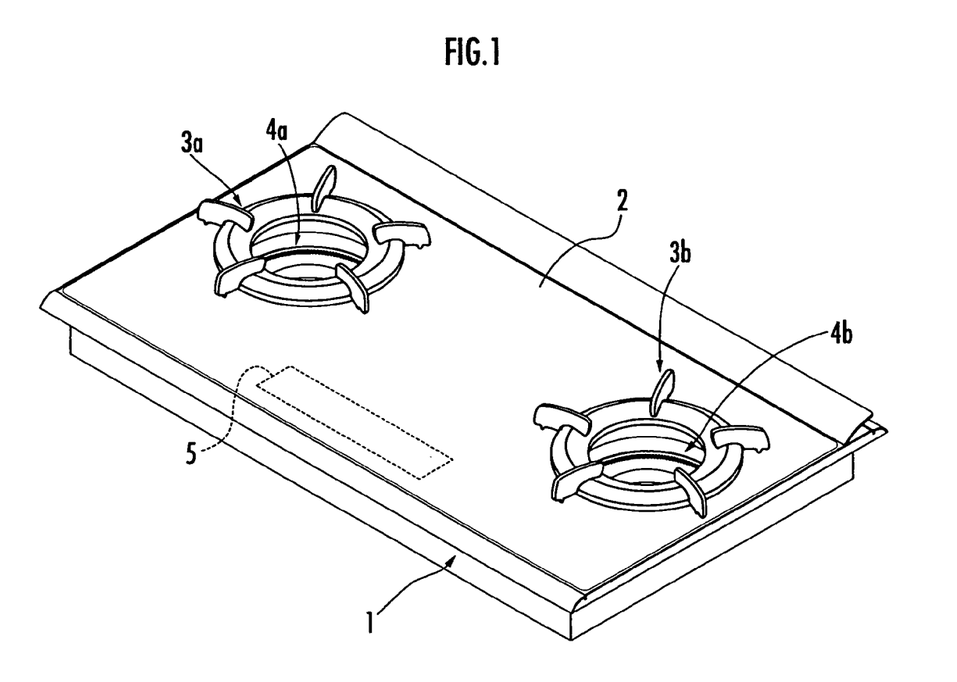
FIG. 1 is a schematic perspective view of a gas cooking appliance to which an example of a motor-operated valve apparatus of the present invention is applied.
Figure 2:
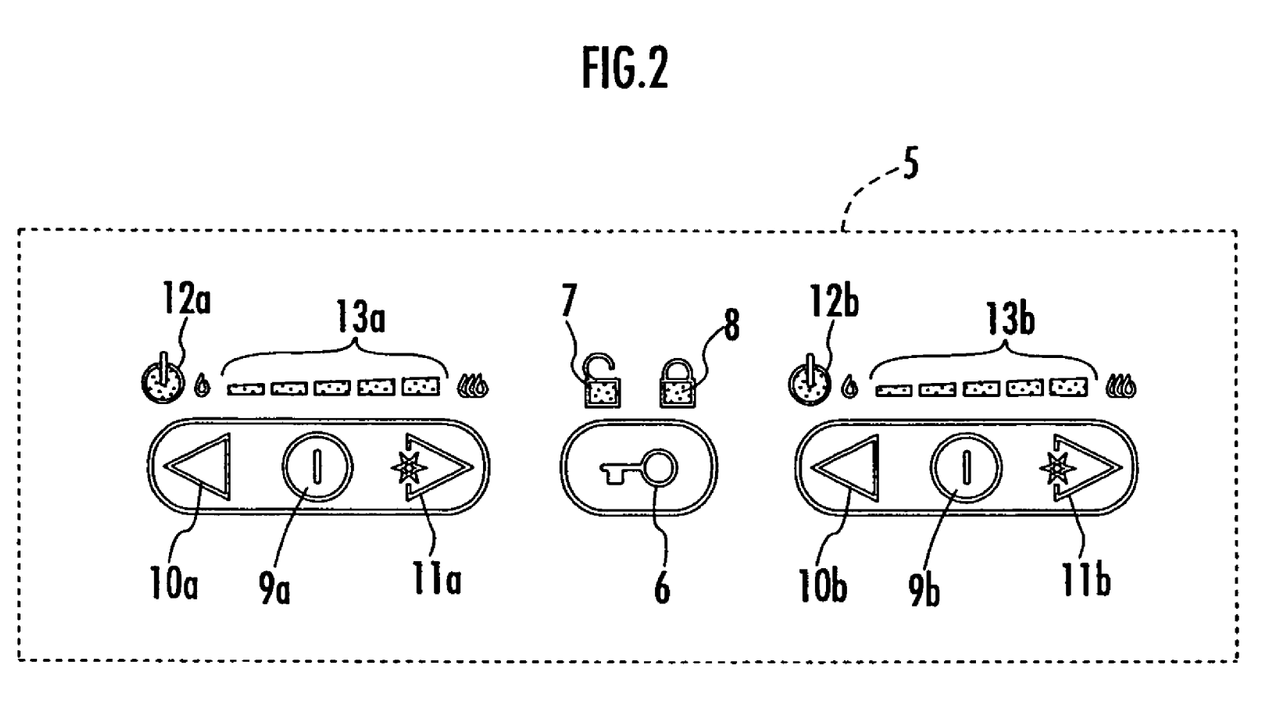
FIG. 2 is a plan view of an operation/display portion provided in the gas cooking appliance of FIG. 1.

FIG. 1 is an outline perspective view of a gas cooking appliance 1, and FIG. 2 is a plan view of an operation/display portion of the gas cooking appliance 1. Referring to these drawings, the gas cooking appliance 1 comprises burners 4a, 4b below two trivets 3a, 3b placed in a top plate 2 of the gas cooking appliance 1, respectively, in this embodiment. An operation/display portion 5 is provided at a center of the top plate 2 on the front side. The operation/display portion 5 comprises a switch 6 and display lamps 7, 8 associated with actuation of the entire gas cooking appliance 1, switches 9a, 10a, 11a and display lamps 12a, 13a associated with actuation of the burner 4a, and switches 9b, 10b, 11b and display lamps 12b, 13b associated with actuation of the burner 4b. In this embodiment, the gas cooking appliance 1 uses a domestic or commercial alternating-current power source as its main power supply.

The switch 6 is an operation switch for switching between an "operating state" in which an instruction (operation) to actuate the burners 4a, 4b is enabled and a "standby" state in which the actuation instruction is disabled when main power is supplied to the gas cooking appliance, the switches 9a, 9b are operation switches for bringing the corresponding burners 4a, 4b into an ignition preparation state (ignition instruction standby state), the switches 10a, 10b are operation switches for reducing thermal powers of the corresponding burners 4a, 4b (gas flows to the burners 4a, 4b), and the switches 11a, 11b are operation switches for increasing thermal powers of the corresponding burners 4a, 4b. In this case, in this embodiment, the switches 11a, 11b also serve as operation switches for providing instructions to ignite the corresponding burners 4a, 4b.

In this embodiment, the burner 4a or 4b is brought into the ignition preparation state when the switch 9a or 9b is operated after the gas cooking appliance 1 is brought into the "operating state" by operation of the switch 6. When the switch 11a is operated when the burner 4a is in the ignition preparation state, for example, the ignition process of the burner 4a is carried out. Moreover, by operating the switch 10a or 11a during burning of the burner 4a, the thermal power of the burner 4a can be set in five stages. If the switch 9a or 6 is operated during the burning operation of the burner 4a, the extinguishment process of the burner 4a is carried out. Such a relation between the actuation of the burner 4a and the operation of the switches 6, 9a, 10a, 11a is same for the burner 4b, and the burner 4b is actuated in the same manner as described above by the operation of the switches 6, 9b, 10b, 11b. Additionally, irrespective of which of the burners 4a and 4b is burning, the burning burner is extinguished if the switch 6 is operated (the gas cooking appliance 1 is brought into the "standby state"). Thus, the burning operation of the burners 4a, 4b is enabled only in the "operating state" of the gas cooking appliance 1, and both the burners 4a, 4b are disabled in the "standby state".

The display lamp 7 is a lamp indicating by lighting that the gas cooking appliance 1 is in the operating state, and the display lamps 12a, 12b are lamps indicating by lighting that the corresponding burners 4a, 4b are in the ignition preparation state and under the burning operation, in other words that the burning operations of the corresponding burners 4a, 4b are enabled. The display lamps 13a, 13b are lamps indicating the levels of thermal powers of the corresponding burners 4a, 4b when they are burning. In this embodiment, the display lamps 13a, 13b have arranged five LEDs corresponding to five kinds of thermal powers settable for the burners 4a, 4b, wherein an LED corresponding to the set thermal power is lighted. The display lamp 8 is a lamp indicating by lighting so called a child lock state in which the switch 6 is continuously operated for a predetermined time period (e.g. 4 seconds) or longer in the standby state of the gas cooking appliance 1, and thus all operations of the gas cooking appliance 1 (except for necessary operations of the switch 6) are disabled. The child lock state is unlocked by continuously operating the switch 6 again for a predetermined time period (e.g. 4 seconds) or longer.

Figure 3:
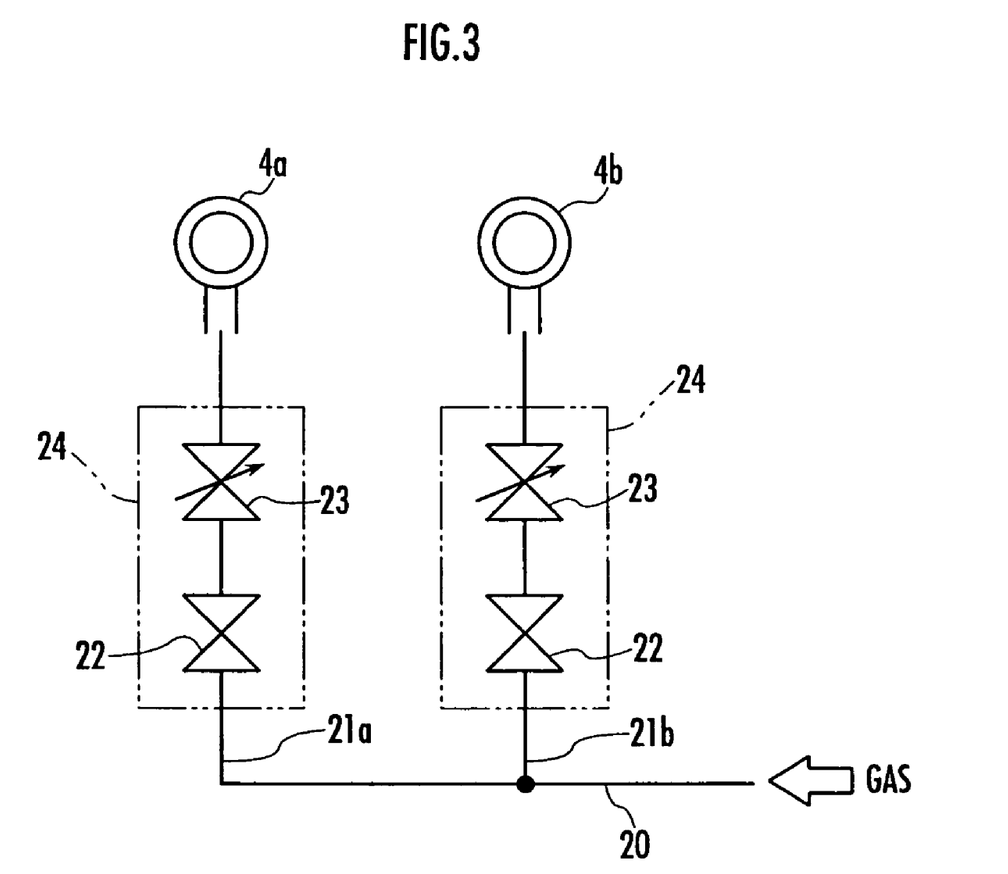
FIG. 3 schematically shows the configuration of a gas flow channel in the gas cooking appliance of FIG. 1.

FIG. 3 schematically shows the configuration of a gas flow channel of the gas cooking appliance 1. In the gas flow channel, gas is supplied to the burners 4a, 4b via gas flow channels 21a, 21b for the burners 4a, 4b, respectively, branched of f a main gas flow channel 20 common for both burners 4a, 4b. The gas flow channels 21a, 21b (fluid flow channels) are each provided with a valve unit 24 comprising an electromagnetic valve 22 for opening and closing the gas flow channel and a thermal power control valve 23 (flow control valve) for controlling a gas flow. The structure of the valve unit 24 is the same for both burners 4a, 4b.

Figure 4:
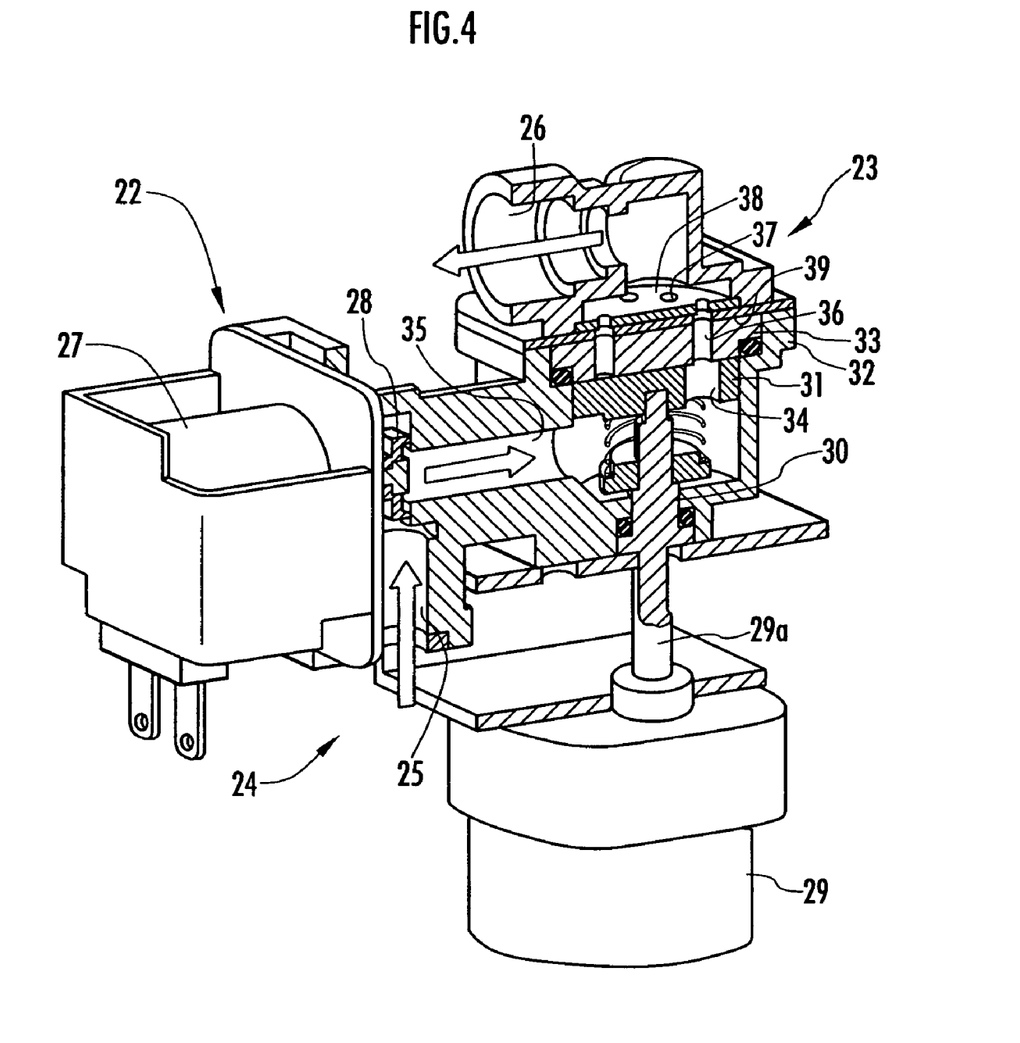
FIG. 4 is perspective view showing a cutaway view of the structure of a valve unit as the motor-operated valve apparatus provided in the gas cooking appliance of FIG. 1.
Figure 5:
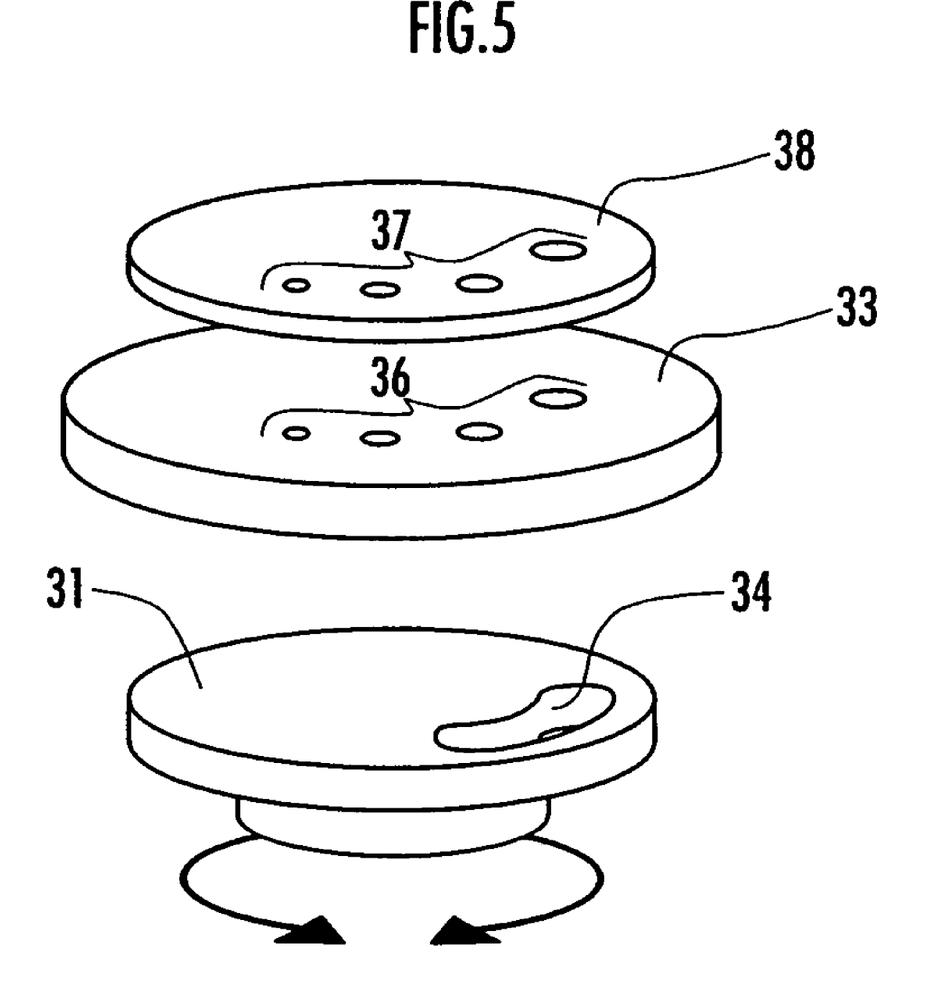
FIG. 5 is a perspective view showing the configuration of main portions of the valve unit of FIG. 4.

The valve unit 24 represents a mechanical portion of the motor-operated valve apparatus of the present invention, the outlined structure thereof will be described with reference to FIGS. 4 and 5. FIG. 4 is a perspective view showing a partial cutaway view of the valve unit 24, and FIG. 5 is an exploded perspective view of main members of the valve unit 24. The void arrow in FIG. 4 shows a direction of gas flow from an entrance channel 25 of the valve unit 24 to an exit channel 26.

The valve unit 24 comprises the electromagnetic valve 22 placed in such a manner that a valve body 28 which is opened by passage of an electric current through a solenoid portion 27 faces the entrance channel 25, and also comprises as main components of the thermal power control valve 23 a disk-shaped rotation plate 31 coupled via a rotation shaft 30 to a drive shaft 29a of a stepping motor 29 and rotatably provided integrally with the drive shaft 29a, and a disk-shaped fixed plate 33 contacting the upper surface of the rotation plate 31 in a slid manner and fixed to a housing 32 of the valve unit 24. The valve body 28 of the electromagnetic valve 22 given impetus toward the closed side by a spring (not shown), and passage of an electric current through the solenoid portion 27 is stopped to close the valve.

As shown in FIG. 5, the rotation plate 31 of the thermal power control valve 23 is provided with a long gas passage hole 34 extending along the circumferential direction (rotation direction), and the gas passage hole 34 communicates with a channel 35 of the electromagnetic valve 22 on the exit side. The fixed plate 33 is provided with a plurality of gas passage holes 36 arranged along the circumferential direction, and the gas passage holes 36 communicate with the exit channel 26 of the valve unit 24. The gas passage holes 36 of the fixed plate 33 are such that by rotating the rotation plate 31 by the stepping motor 29, the gas passage hole 34 of the rotation plate 31 communicates with one or more of the gas passage holes 36 of the fixed plate 33. At this time, the number or combination of gas passage holes 36 of the fixed plate 33 communicating the gas passage hole 34 is changed with the rotation position of the rotation plate 31, whereby the effective opening area (opening degree) of the gas channel constituted by the gas passage hole 34 of the rotation plate 31 and the gas passage holes 36 of the fixed plate 33 communicating therewith is changed. In this case, the rotation plate 31 has its rotation range (motion range) mechanically restrained by a stopper (not shown) provided in the housing 32 of the valve unit 24 or the like, and can be rotated in a range between a rotation position in which the opening degree of the gas flow channel constituted by the gas passage holes 34 of the rotation plate 31 and the gas passage holes 36 of the fixed plate 33 is a predetermined minimum opening degree (hereinafter referred to as minimum opening degree rotation position) and a rotation position in which the opening degree is a predetermined maximum opening degree (hereinafter referred to as maximum opening degree rotation position).

A disk-shaped orifice plate 38 provided with a plurality of gas passage holes 37 communicating with the gas passage holes 36 of the fixed plate 33, respectively, is detachably attached via a seal member 39 to the upper surface of the fixed plate 33. The orifice plate 39 is to adjust the effective opening area of the gas passage hole 36 of the fixed plate according to the type of gas used, and the diameter of the gas passage hole 37 is consistent with the type of gas.

Figure 6:
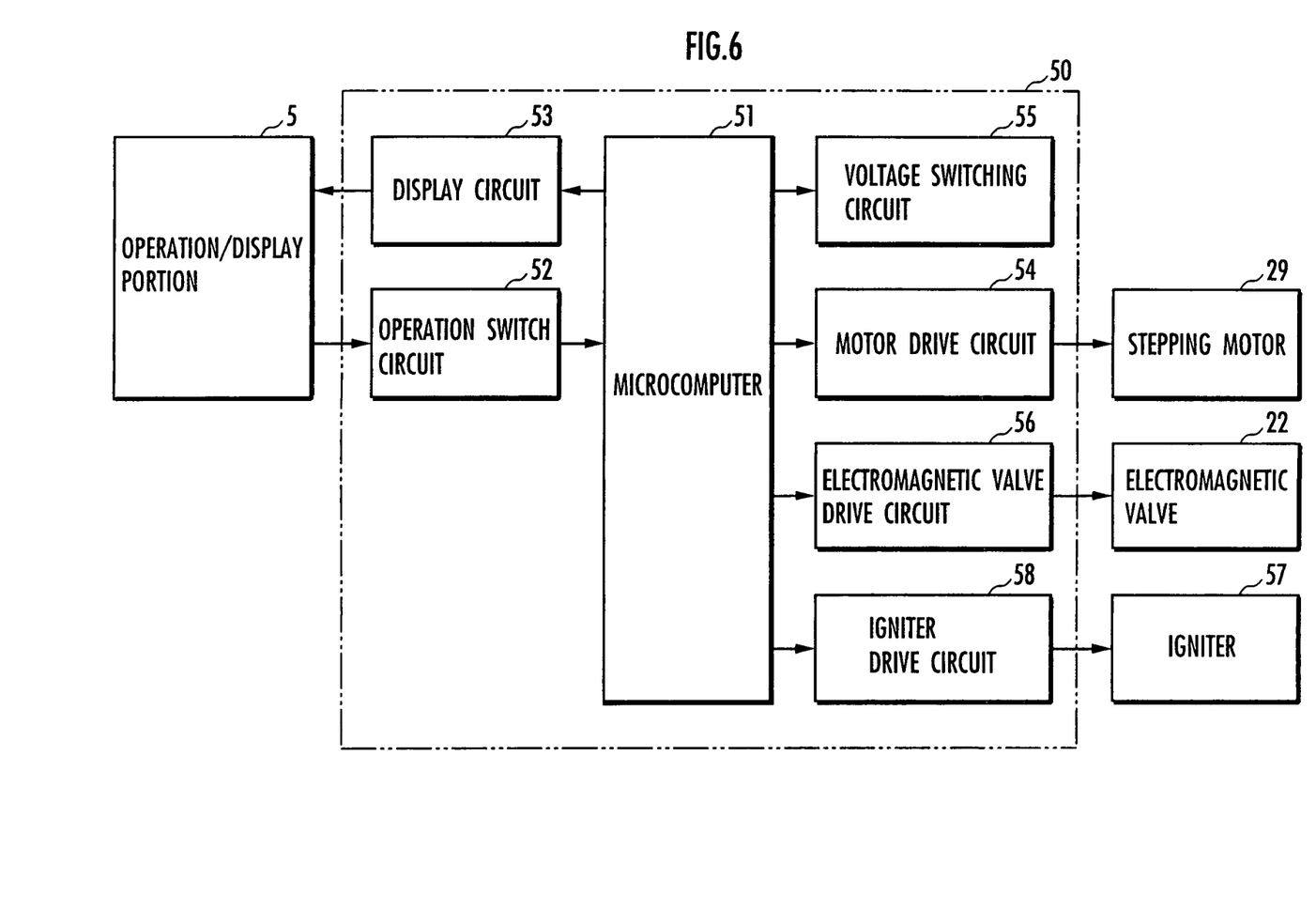
FIG. 6 is a block diagram showing the configuration of an electronic circuit unit provided in the gas cooking appliance of FIG. 1.

FIG. 6 is a block diagram showing the main configuration of an electronic circuit unit 50 provided in the gas cooking appliance 1 for controlling the operation of the gas cooking appliance 1. As shown in the figure, the electronic circuit unit 50 comprises a microcomputer 51, an operation switch circuit 52 generating operation signals of the switches 6, 9*a* to 11*a* and 9*b* to 11*b* of the operation/display panel 5 and inputting the signals to the microcomputer 51, a display circuit 53 driving the display lamps 7, 8, 12*a*, 13*a*, 12*b*, 13*b* of the operation/display panel 5 according to an instruction from the microcomputer 51, a motor drive circuit 54 supplying drive pluses to the stepping motors 29 of the valve units 24 according to an instruction from the microcomputer 51, a voltage switching circuit 55 switching the voltage level of the drive pulse generated by the motor drive circuit 54 according to an instruction from the microcomputer 51, an electromagnetic valve drive circuit 56 driving the electromagnetic valves 22 according to an instruction from the microcomputer 51, and an igniter drive circuit 58 driving an igniter (ignition device) 57 for igniting the burners 4*a*, 4*b* according to an instruction from the microcomputer 51. In this embodiment, the voltage of the pulse supplied from the motor drive circuit 54 to the stepping motor 29 can be switched between two levels: a high level and a low level, by the voltage switching circuit 55. The motor drive circuit 54 and the electromagnetic valve drive circuit 56 are provided separately for each stepping motor 29 and each electromagnetic valve 22.

Although not shown in FIG. 6, detection signals from a sensor detecting ignition of the burners 4*a*, 4*b* and a sensor detecting occurrence of various abnormal events in the gas cooking appliance 1 are input to the microcomputer 51, in addition to operation signals of the switches 6, 9*a* to 11*a* and 9*b* to 11*b* of the operation/display panel 5. In this embodiment, the gas cooking appliance 1 is provided with a buzzer and its drive circuit (not shown), and the buzzer is appropriately actuated according to an instruction from the microcomputer 51. The microcomputer 51 controls the operations of the display lamps 7, 8, 12*a*, 13*a*, 12*b*, 13*b*, the stepping motor 29, the electromagnetic valve 22, the igniter 57 and the like based on input signals and programs stored and held in advance. Hereinafter, the stepping motor 29 is referred to simply as motor 29.

In addition, the microcomputer 51 represents control means in the present invention, and includes motor standby operation controlling means and shift-to-home position controlling means as part of its function.

Actuation of the gas cooking appliance 1 of this embodiment will now be described with reference to flowcharts of FIGS. 7 and 8. The basic actuation of the gas cooking appliance 1 for the operations of the burners 4*a*, 4*b*, and therefore the following description is intended mainly for the operation of the burner 4*a*, for example. In the following description, five stage thermal powers settable for the burners 4*a*, 4*b* are referred to as thermal power 1, thermal power 2, . . . , thermal power 5 in ascending order with the first thermal power the lowest. Thus, the opening degree of the thermal power control valve (defined by the rotation position of the rotation plate 31) corresponding to each thermal power N (N=1, 2, . . . , 5) increases with the value of N. Additionally, the opening degree of the thermal power control valve 23 corresponding to the thermal power 1 is an opening degree slightly larger than the minimum opening degree of the thermal power control valve 23 which is mechanically restrained, and the opening degree of the thermal power control valve 23 corresponding to the thermal power 5 is an opening degree slightly smaller than the maximum opening degree of the thermal power control valve 23 which is mechanically restrained. In this embodiment, the opening degree of the thermal power control valve 23 corresponding to the thermal power 4 is an opening degree predetermined as an opening degree during ignition of each burner 4*a* (this is equivalent to the ignition position in the present invention, and may be hereinafter referred to as an opening degree for ignition). The rotation position of the rotation plate 31 of the thermal power control valve 23 corresponding to the thermal power 4 is a rotation position closer to the maximum opening degree rotation position of the minimum opening degree rotation position and the maximum opening degree rotation position.

When the gas cooking appliance 1 is connected to a domestic or commercial alternating-current power source to start the supply of main power to the gas cooking appliance 1 (including the electronic circuit unit 50) at STEP 1, processes of STEPs 2 and 3 are first carried out by the control operation of the microcomputer 51. The processes are done by the function of shift-to home position controlling means of the microcomputer 51. For explanation, the voltage switching circuit 55 sets the voltage of the pulse supplied to each motor 29 to a low level voltage according to an instruction from the microcomputer 51. In this state, the microcomputer 51 instructs the motor drive circuit 54 to supply a predetermined number of pulses to each motor 29, whereby the thermal power control valves 23 associated with the burners 4*a*, 4*b* are displaced to their home positions. In this embodiment, the home position of each thermal power control valve 23 is a position corresponding to the minimum opening degree rotation position of the rotation plate 31, i.e. the displacement position of the minimum opening degree of the thermal power control valve 23. The number of pulses supplied to each motor 29 (the predetermined number is hereinafter referred to as the number of pulses for shift to the home position) is the number of pulses required for rotating the rotation plate 31 of each thermal power control valve 23 from the maximum opening degree rotation position to the minimum opening degree rotation position (displacing the thermal power control valve 23 from the maximum opening degree to the minimum opening degree) plus several pulses (e.g. 15 to 20 pulses) as an allowance. That is, the number of pulses for shift to the home position is a number of pulses allowing the rotation plate 31 to be rotated by an angle slightly larger than a total angle of rotation of the rotation plate 31 from the maximum opening degree rotation position to the minimum opening degree rotation position. A minimum necessary number of pulses required for rotating the rotation plate 31 of the thermal power control valve 23 from the maximum opening degree rotation position to the minimum opening degree rotation position can be determined from the total angle of rotation and an angle of rotation of the rotation plate 31 per pulse to the motor 29.

As described in detail later, in this embodiment, when the process of STEP 2 is carried out, the opening degree of the thermal power control valve 23 is basically an opening degree close to the maximum opening degree.

Then, at STEP 3, the voltage switching circuit 55 sets the voltage of the pulse supplied to each motor 29 to a high level voltage according to an instruction from the microcomputer 51. In this state, the microcomputer 51 instructs the motor drive circuit 54 to drive each motor 29 to a position corresponding to the thermal power 5. In this case, the number of pulses supplied from the motor drive circuit 54 to each motor 29 is a number of pulses equivalent to an angle of rotation from the minimum opening degree rotation position of the rotation plate 31 of the thermal power control valve 23 corresponding to each motor 29 to the rotation position of the rotation plate 31 corresponding to the thermal power 5.

The processes of STEPs 2, 3 described above are carried out concurrently for each of the motor 29 on the burner 4a side and the motor 29 on the burner 4b side. These processes are not necessarily carried out concurrently for each motor 29, but may be carried out one after another (the processes of STEPs 2, 3 are carried out for one motor 29, flowed by carrying out the processes of STEPs 2, 3 for the other motor 29).

With completion of the processes of STEPs 2, 3, the gas cooking appliance 1 is brought into the standby state (STEP 4). In this standby state, the microcomputer 51 checks whether the switch 6 of the operation/display portion 5 is operated or not by output signals of the operation switch circuit 52 at STEP 5. If the switch 6 is operated, the microcomputer 51 carries out the process of STEP 6 to temporarily sound the buzzer (not shown) and light the display lamp 7 (turn the buzzer and the display lamp 7 on). Thus, the gas cooking appliance 1 is brought into the operating state (STEP 7). If the switch 6 is not operated in the standby state, the standby state continues.

Figure 7:
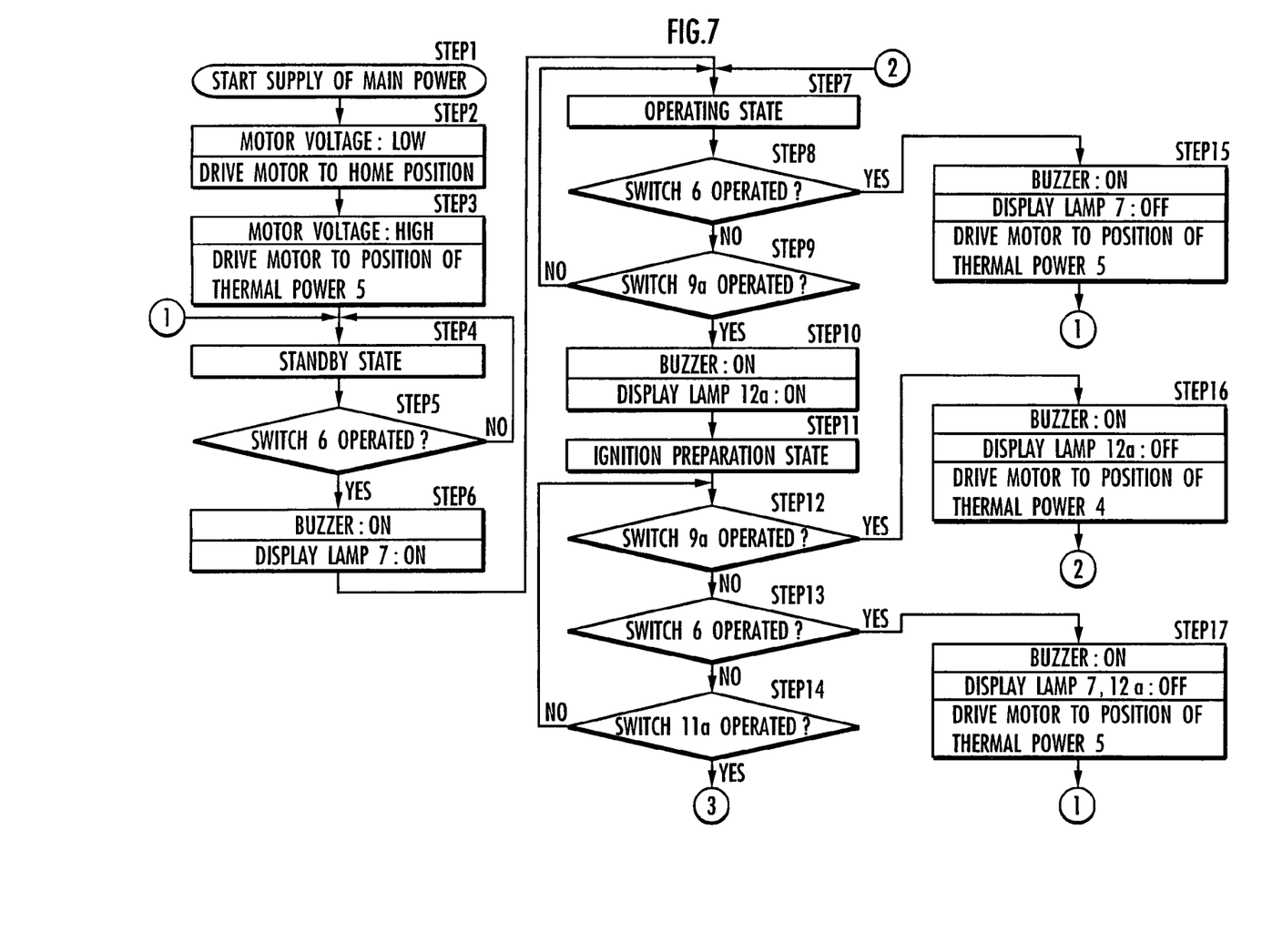
FIG. 7 is a flowchart showing actuation of the gas cooking appliance of FIG. 1.
Figure 8:
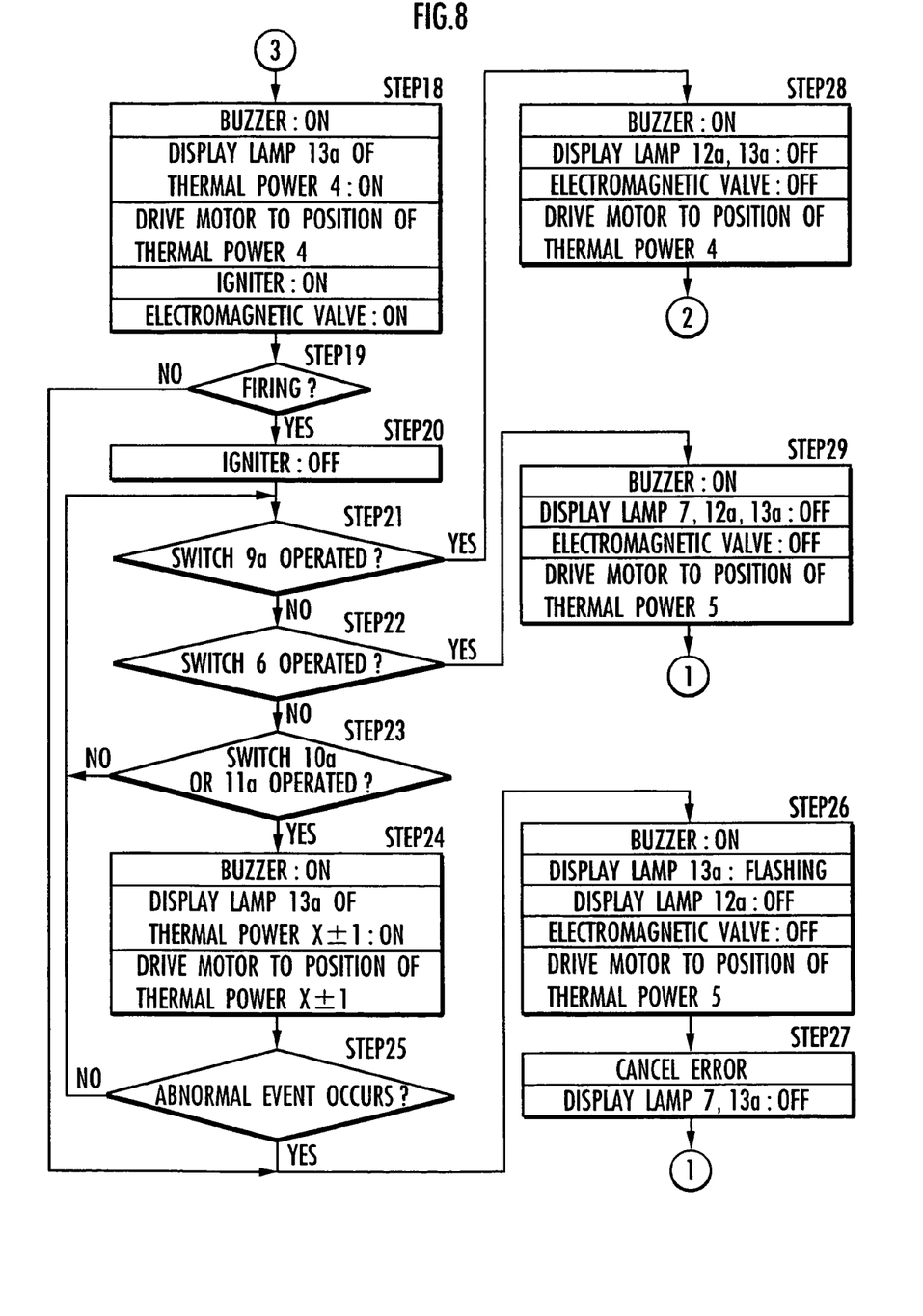
FIG. 8 is a flowchart showing actuation of the gas cooking appliance of FIG. 1.

In FIGS. 7 and 8, "ON" of the buzzer means that the buzzer is temporarily sounded, "ON" and "OFF" of the display lamps 7, 8, 12a, 13a, 12b, 13b mean lighting and light-out, respectively, and "ON" and "OFF" of the electromagnetic valve 22 mean opening and closure of the electromagnetic valve 22, respectively. In the following description, the burner 4b is not operated, but kept in an extinguished state.

When the gas cooking appliance 1 is brought into the operating state at step 7, the microcomputer 51 checks whether the switches 6, 9a are operated or not, based on output signals of the operation switch circuit 52 at STEPs 8, 9. If none of the switches 6, 9a is operated, the operating state continues.

If the switch 6 is operated at STEP 8, the microcomputer 51 carries out the process of STEP 15, and then the gas cooking appliance 1 returns to the "standby state" in STEP 4. At STEP 15, the microcomputer 51 temporarily sounds the buzzer (not shown), lights out the display lamp 7, and drives the motor 29 to a position corresponding to the thermal power 5. Here, the motor driven to the position corresponding to the thermal power 5 refers to both the motor 29 on the burner 4a side and the motor 29 on the burner 4b side. The number of pulses supplied to each motor 29 from the motor drive circuit 54 is the number of pulses equivalent to an angle of rotation of the rotation plate 31 of each thermal power control valve 23 from the current rotation position to a rotation position corresponding to the thermal power 5. The process for driving each motor 29 to the position corresponding to the thermal power 5 at STEP 15 in this way is carried out by the function of the motor standby operation controlling means of the microcomputer 51.

Additionally, if the burning operation of the burner 4b is carried out at the time of determination at STEP 8, the microcomputer 51 closes the electromagnetic valve 22 on the burner 4b side (interrupts passage of an electric current through the electromagnetic valve 22) to extinguish the burner 4b, and then drives both motors 29 to the position corresponding to the thermal power 5 at STEP 15. When both motors 29 are driven at STEP 15, they are driven concurrently in this embodiment, but they may be driven one after another.

If the switch 6 is not operated and the switch 9a is operated (the result of determination at STEP 9 is YES) when the gas cooking appliance 1 is in the operating state, the microcomputer 51 temporarily sounds the buzzer (not shown) and lights up the display lamp 12a at STEP 10. Thus, the gas cooking appliance 1 is brought into the "ignition preparation state" (more specifically, ignition preparation state on the burner 4a side) (STEP 11).

In the ignition preparation state, the microcomputer 51 checks whether the switches 9a, 6, 11a are operated or not based on output signals of the operation switch circuit 52 at STEPs 12 to 14. If none of the switches 9a, 6, 11a is operated, the ignition preparation state continues.

If the switch 9a is operated at STEP 12, the microcomputer 51 carries out the process of STEP 16, and then the gas cooking appliance 1 returns to the operating state in STEP 7 (the ignition preparation state is canceled). At STEP 16, the microcomputer 51 temporarily sounds the buzzer, lights out the display lamp 12a, and drives the motor 29 (specifically, the motor 29 on the burner 4a side) to the position corresponding to the thermal power 4. The number of pulses supplied from the motor drive circuit 54 to the motor 29 on the burner 4a side is a number of pulses equivalent to an angle of rotation of the rotation plate 31 of the thermal power control valve 23 on the burner 4a side from the current rotation position to the rotation position corresponding to the thermal power 4 (rotation position corresponding to the opening degree for ignition of the thermal power control valve 23). The reason why the motor 29 on the burner 4a side is driven to the position corresponding to the thermal power 4 at STEP 16 is that there is a high possibility that the burning operation of the burner 4a is subsequently carried out.

If the switch 6 is operated at STEP 13, the microcomputer 51 carries out the process of STEP 17, and then the gas cooking appliance 1 returns to the standby state in STEP 4. At STEP 17, the microcomputer 51 temporarily sounds the buzzer (not shown), lights out the display lamps 7, 12a, and drives the motor 29 to the position corresponding to the thermal power 5. Here, as in the case of STEP 15 described above, the motor driven to the position corresponding to the thermal power 5 refers to both the motor 29 on the burner 4a side and the motor 29 on the burner 4b side. The supply of pulses to the motors 29 is carried out in the same manner as in STEP 15. Drive of the motors 29 at this time is carried out by the function of the motor standby operation controlling means of the microcomputer 51.

Additionally, if the burning operation of the burner 4b is carried out at the time of determination at STEP 13, the microcomputer 51 closes the electromagnetic valve 22 on the burner 4b side (interrupts passage of an electric current through the electromagnetic valve 22), extinguishes the burner 4b, and then drives both motors 29 to the position corresponding the thermal power 5 at STEP 17 as in the case of STEP 15.

If the switches 9a, 6 are not operated, but the switch 11a is operated (the result of determination at STEP 14 is YES) when the gas cooking appliance 1 is in the ignition preparation state on the burner 4a side, the microcomputer 51 carries out the process of STEP 18. The process of STEP 18 is the ignition process of the burner 4a, and the microcomputer 51 temporarily sounds the buzzer and lights up the LED of the display lamp 13a corresponding to the thermal power 4. The motor 29 on the burner 4a side is driven to the position corresponding to the thermal power 4, the igniter 57 on the burner 4a side is then actuated (the igniter 57 is turned on) via the igniter drive circuit 58, and the electromagnetic valve 22 on the burner 4a side is opened (the supply of gas to the burner 4a is started). The number of pulses supplied to the motor 29 on the burner 4a side when the motor 29 is driven to the position corresponding to the thermal power 4 is a number of pulses equivalent to an angle of rotation of the rotation plate 31 of the thermal power control valve 23 on the burner side 4*a* from the current rotation position to the rotation position corresponding to the thermal power 4.

In this embodiment, when the ignition process of the burner 4*a* is started at STEP 18, the thermal power control valve 23 is displaced to the opening degree position of the thermal power 4 equivalent to a required opening degree for ignition, or the opening degree position of the thermal power 5 higher by 1 step than the thermal power 4. Thus, the thermal power control valve 23 can be quickly displaced to the opening degree position of the thermal power 4. Therefore, the ignition process of the burner 4*a* can be carried out speedily when the switch 11*a* is operated.

Then, at STEP 19, firing of the burner 4*a* is observed. If firing of the burner 4*a* is not observed even if the igniter 57 is operated for a certain time period in the ignition process described above, the microcomputer 51 carries out processes of STEPs 26, 27, and then the gas cooking appliance 1 returns to the standby state in STEP 4. The processes of STEPs 26, 27 will be described later.

If firing of the burner 4*a* is observed, the microcomputer 51 stops the drive of the igniter 57 (turns the igniter 57 off) at STEP 20. Thereupon, the burning operation of the burner 4*a* is started.

Then, the microcomputer 51 checks whether the switches 9*a*, 6, 11*a*, 11*a* are operated or not through STEPs 21 to 23 based on output signals of the operation switch circuit 52. If none of the switches 9*a*, 6, 10*a*, 11*a* is operated, the burning operation of the burner 4*a* continues.

If the switch 9*a* is operated at STEP 21, the microcomputer 51 carries out the process of STEP 28, and then the gas cooking appliance 1 returns to the operation state in STEP 7. The process of STEP 28 is the extinguishment process of the burner 4*a*, in which the microcomputer 51 temporarily sounds the buzzer and lights out the display lamps 12*a*, 13*a*. Moreover, the microcomputer 51 closes the electromagnetic valve 22 on the burner 4*a* side to extinguish the burner 4*a*, and drives the motor 29 on the burner 4*a* side to the position corresponding to the thermal power 4 for ignition. That is, the thermal power control valve 23 is displaced to the opening degree for ignition. The number of pulses supplied to the motor 29 on the burner 4*a* side when the motor 29 is driven to the position corresponding to the thermal power 4 for ignition is a number of pulses equivalent to an angle of rotation of the rotation plate 31 of the thermal power control valve 23 on the burner 4*a* side from the current rotation position to the rotation position corresponding to the thermal power 4 (rotation position corresponding to the opening degree for ignition of the thermal power control valve 23).

If the switch 6 is operated at STEP 22, the microcomputer 51 carries out the process of STEP 29, and then the gas cooking appliance 1 returns to the standby state in STEP 4. At STEP 29, the microcomputer 51 temporarily sounds the buzzer and lights out the display lamps 7, 12*a*, and 13*a*. The microcomputer 51 closes the electromagnetic valve 22, and drives the motor 29 to the position corresponding to the thermal power 5 for ignition. For the electromagnetic valve 22 closed at this time, only the electromagnetic valve 22 on the burner 4*a* side is closed if the burning operation of only the burner 4*a* is carried out, but if the burning operation of the burner 4*b* is also carried out, the electromagnetic valve 2 on the burner 4*b* is closed as well. Thus, both burners 4*a*, 4*b* are brought into the extinguished state by the process of STEP 29. The motor 29 driven at STEP 29 refers to both the motor 29 on the burner 4*a* side and the motor 29 on the burner 4*b* side as in the case of STEP 15 described above.

The supply of pulses to each motor 29 is carried out in the same manner as in STEP 15. The drive of each motor 29 at this time is carried out by the motor standby operation controlling means of the microcomputer 51.

If the switches 9*a*, 6 are not operated, but the switch 10*a* or 11*a* is operated during the burning operation of the burner 4*a* (the result of determination at STEP 23 is YES), the microcomputer 51 temporarily sounds the buzzer, and lights up the LED corresponding to the thermal power X+1 or X−1 (X: current thermal power) of the display lamp 13*a* at STEP 24. The LED corresponding to the thermal power X+1 (the upper limit of X+1 is "5") if the switch 11*a* is operated, and the LED corresponding to the thermal power X−1 (the lower limit of X−1 is "1") if the switch 10*a* is operated. At STEP 24, the microcomputer 51 drives the motor 29 on the burner 4*a* side to the position corresponding to the updated thermal power X+1 ($\leqq 5$) or X−1 ($\geqq 1$). In this case, the number of pulses supplied to the motor 29 on the burner 4*a* is a number of pulses equivalent to an angle of rotation of the rotation plate 31 of the thermal power control valve 23 on the burner 4*a* side from the rotation position corresponding to the current thermal power to the rotation position corresponding to the updated thermal power X+1 or X−1.

The opening degree of the thermal power control valve 23 is adjusted to be an opening degree corresponding to the updated thermal power X+1 or X−1 by the process of STEP 24.

Then, at STEP 25, the microcomputer 51 checks whether an abnormal event (misfire of the burner 4*a*, or the like) occurs or not based on outputs of various sensors, and if no abnormal event occurs, the processes beginning in STEP 21 are continued.

If some abnormal event occurs at STEP 25, the microcomputer 51 carries out a process same as the process that would be carried out if firing is not observed at STEP 19 described above, at STEPs 26, 27, and then the gas cooking appliance 1 returns to the standby state in STEP 4.

At STEP 26, the microcomputer 51 temporarily sounds the buzzer, makes the display lamp 13*a* flash, and lights out the display lamp 12*a*. The microcomputer 51 closes the electromagnetic valve 22, and drives the motor 29 to the position corresponding to the thermal power 5. For the electromagnetic valve 22 closed at this time, only the electromagnetic valve 22 on the burner 4*a* side is closed if the burning operation of only the burner 4*a* is carried out, but if the burning operation of the burner 4*b* is also carried out, the electromagnetic valve 2 on the burner 4*b* side is closed as well. Thus, both burners 4*a*, 4*b* are brought into the extinguished state by the process of STEP 26. The motor 29 driven at STEP 26 refers to both the motor 29 on the burner 4*a* side and the motor 29 on the burner 4*b* side as in the case of STEP 15 described above. The supply of pulses to each motor 29 is carried out in the same manner as in STEP 15. The drive of each motor 29 at this time is carried out by the motor standby operation controlling means of the microcomputer 51.

At STEP 27 subsequent to STEP 26, the microcomputer 51 carries out a predetermined error cancellation process and lights out the display lamps 7, 13*a*.

In the above description with FIGS. 7 and 8 (description beginning with STEP 7), the operation on the burner 4*a* side has been mainly described, but the operation on the burner 4*b* side is carried out in the same manner. In this case, the switches 9*a*, 10*a*, 11*a* in FIGS. 7 and 8 are replaced by the switches 9*b*, 10*b*, 11*b*, respectively, and the display lamps 12*a*, 13*a* are replaced by the display lamps 12*b*, 13*b*, respectively, FIGS. 7 and 8 serve as flowcharts showing the operation on the burner 4b side. In this case, however, the "motor" in STEPs 16, 18, 24, 28 is the motor 29 on the burner 4b side, and the "electromagnetic valve" in STEPs 18, 28 is the electromagnetic valve 22 on the burner 4b side. Other aspects are same as those in actuation on the burner 4a side.

When the gas cooking appliance 1 is brought into the standby state by the actuation of the gas cooking appliance 1 described above (at this time, electric power of the main power source is supplied to the electronic circuit unit 50 including the microcomputer 51 and the like, and the supply of gas to both burners 4a, 4b is interrupted), each motor 29 is driven to the position corresponding to the thermal power 5, i.e. the position close to the maximum opening degree of each thermal power control valve 23. The standby state of the gas cooking appliance 1 is a state in which the burners 4a, 4b are not operated, and therefore when the main power source is interrupted, the interruption is usually done in the standby state of the gas cooking appliance 1. Thus, when the main power source of the gas cooking appliance 1 is interrupted, and then the main power source is turned on again to carry out the process of STEP 2 described above to supply to the motor 29 the number of pulses for shift to the home position, the thermal power control valve 23 is mechanically restrained to the minimum opening degree (home position of the thermal power control valve 23) just before the supply of pulses is completed. Thus, the number of pulses supplied to the motor 29 after the opening degree of the thermal power control valve 23 arrives at the minimum opening degree is very small and as a result, a time period over which a disorder of the motor 29 occurs is very short. Occurrence of abnormal sounds and vibrations during the disorder can be in turn limited to only a very short time period. The voltage of the pulse at this time is a low level voltage, the generated torque of the motor 29 is therefore small and as a result, abnormal sounds and vibrations can be limited to a low level.

Additionally, in case where power fails or a plug socket of the main power source is disconnected during the operation of the gas cooking appliance 1 (during the burning operation of burners 4a, 4b, or during the operation of the motor 29), the opening degree of the thermal power control valve 23 is maintained at an opening degree (indefinite) at the time when power fails or the plug socket is disconnected. When electric power of the main power source is then supplied to the gas cooking appliance 1 again, the process of STEP 2 described above is carried out. In this case, the opening degree of each thermal power control valve 23 just before the start of the process of STEP 2 is indefinite, but each motor 29 is supplied with the number of pulses for shift to the home position which is the number of pulses slightly larger than the minimum necessary number of pulses required for displacing the thermal power control valve 23 from the maximum opening degree to the minimum opening degree, thus making it possible to reliably displace each thermal power control valve 23 to the home position.

In the embodiment described above, the minimum opening degree of the thermal power control valve 23 is the home position, but the maximum opening degree may be the home position. Alternatively, when s shift to the home position is made, a stopper may be protruded to a position near the minimum opening degree or the like of the thermal power control valve 23, and a position in which the thermal power control valve 23 is engagedly stopped by the stopper may be defined as the home position. The motion range of the thermal power control valve 23 in this case is a range between the position in which it is engagedly stopped by the stopper and the maximum or minimum opening degree position.

The embodiment described above has been described taking the motor-operated valve apparatus of the gas cooking appliance 1 as an example, but the present invention may also be applied to, for example, a motor-operated valve apparatus driving a water flow control valve of a hot water supplying apparatus.

In the embodiment described above, an alternating-current power source is used as the main power source of the gas cooking appliance 1, but a battery may be used as a power source. In this case, power capable of being supplied by the battery cannot be so much increased in general, and therefore in the case where a plurality of thermal power control valves driven by the stepping motor are provided as in the gas cooking appliance 1 of the embodiment described above, it is desirable that when the thermal power control valves are shifted to the home position, they should be shifted to the home position one after another.

In the embodiment described above, the motor 29 is driven to the position corresponding to the thermal power 4 to displace the thermal power control valve 23 to the opening degree for ignition at STEPs 16, 28 for quickly carrying out the ignition process matching instructions to ignite the burners 4a, 4b, but for the embodiment of the present invention, the motor 29 may be driven to the position corresponding to the thermal power 5 at STEPs 16, 28.

What is claimed is:

1. A motor-operated valve apparatus comprising:
   a flow control valve provided in a fluid channel for controlling a fluid flow and having its motion range mechanically restrained;
   a stepping motor for driving the flow control valve; and
   control means for supplying pulses to the stepping motor via a motor drive circuit and controlling the amount of displacement of the flow control valve by the stepping motor according to the number of pulses supplied,
   wherein said control means comprises:
   motor standby operation controlling means for supplying pulses to said stepping motor so that the flow control valve is displaced to a predetermined position closer to a first end of both ends of the motion range of said flow control valve when said fluid channel is interrupted while said motor drive circuit and control means receive electric source power; and
   shift-to-home position controlling means for supplying to said stepping motor a predetermined number of pulses capable of displacing the flow control valve from said first end to a home position to displace the flow control valve to the home position, with the home position of the flow control valve being a second end of both ends of the motion range of said flow control valve, when the supply of electric source power is restarted after the supply of the electric source power to at least said motor drive circuit and control means is stopped.

2. The motor-operated valve apparatus according to claim 1, wherein the voltage of the pulse supplied to said stepping motor by said shift-to-home position controlling means is lower than at least the voltage of the pulse supplied to said stepping motor by said control means during control of the fluid flow in said fluid channel.

3. The motor-operated valve apparatus according to claim 1, wherein said flow control valve is a thermal power control valve provided in a channel for supplying gas to a burner of a gas cooking appliance for controlling a flow of the gas to the burner.

4. The motor-operated valve apparatus according to claim 3, wherein said first end is one end of both ends of said motion range, which is closer to an ignition position predetermined as a displacement position of said thermal power control valve when said burner is ignited.

5. The motor-operated valve apparatus according to claim 3, wherein said gas cooking appliance comprises a plurality of sets of said burner, thermal power control valve, stepping motor and motor drive circuit.

* * * * *